US011965675B2

(12) United States Patent
Walz et al.

(10) Patent No.: US 11,965,675 B2
(45) Date of Patent: Apr. 23, 2024

(54) ELECTRIC HEATING DEVICE

(71) Applicant: Eberspächer catem GmbH & Co. KG, Herxheim (DE)

(72) Inventors: Kurt Walz, Hagenbach (DE); Michael Niederer, Kapellen-Drusweiler (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 143 days.

(21) Appl. No.: 17/667,908

(22) Filed: Feb. 9, 2022

(65) Prior Publication Data
US 2022/0268484 A1 Aug. 25, 2022

(30) Foreign Application Priority Data

Feb. 11, 2021 (DE) ...................... 10 2021 103 266.0

(51) Int. Cl.
| F24C 1/10 | (2021.01) |
| F24C 1/14 | (2021.01) |
| F24H 1/12 | (2022.01) |
| H05B 3/06 | (2006.01) |
| B60H 1/22 | (2006.01) |
| F24H 3/06 | (2022.01) |
| F24H 9/00 | (2022.01) |
| F24H 9/13 | (2022.01) |
| F24H 9/1818 | (2022.01) |

(52) U.S. Cl.
CPC ........... *F24H 1/121* (2013.01); *B60H 1/2221* (2013.01); *F24H 3/062* (2013.01); *F24H 9/0015* (2013.01); *F24H 9/139* (2022.01); *F24H 9/1827* (2013.01); *F24H 2250/04* (2013.01); *H05B 2203/02* (2013.01); *H05B 2203/023* (2013.01)

(58) Field of Classification Search
None
See application file for complete search history.

(56) References Cited

U.S. PATENT DOCUMENTS

| 6,093,909 A | * | 7/2000 | Beetz | ....................... | H05B 3/14 |
| | | | | | 219/202 |
| 6,330,395 B1 | | 12/2001 | Wu | | |
| 2006/0289475 A1 | | 12/2006 | Tung et al. | | |
| 2016/0069588 A1 | | 3/2016 | Kominami et al. | | |

(Continued)

FOREIGN PATENT DOCUMENTS

| DE | 10 2010 048 593 | 4/2012 |
| DE | 10 2011 081 831 | 2/2013 |
| DE | 10 2012 007 507 | 10/2013 |

(Continued)

OTHER PUBLICATIONS

EP1935684A1, Frank et al., Jun. 2008, Bib data sheet. (Year: 2008).*

*Primary Examiner* — Joseph M. Pelham
(74) *Attorney, Agent, or Firm* — Boyle Fredrickson S.C.

(57) ABSTRACT

An electric heating device includes at least two hollow profile elements which form a fluid channel for a fluid to be heated and, opposite the fluid channel, a heating chamber which is bounded by opposite contact surfaces against which at least one PTC element abuts in a heat-conducting manner. A scalable and easier to assemble electric heating device is achieved by connecting the hollow profile elements to one another by complementary form-fit segments.

11 Claims, 5 Drawing Sheets

(56) References Cited

U.S. PATENT DOCUMENTS

2017/0130991 A1  5/2017  Liu
2017/0370614 A1  12/2017  Liu

FOREIGN PATENT DOCUMENTS

| DE | 20 2015 001 148 | 5/2016 | |
|---|---|---|---|
| EP | 0 899 985 | 3/1999 | |
| EP | 1935684 A1 * | 6/2008 | ........... B60H 1/2225 |
| EP | 2 022 687 | 2/2009 | |

* cited by examiner

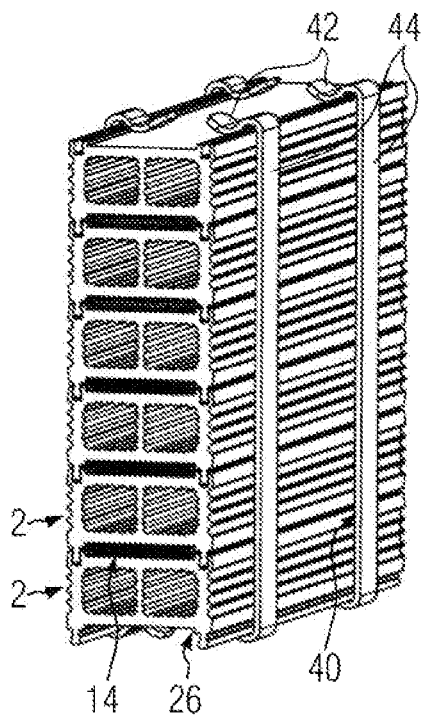 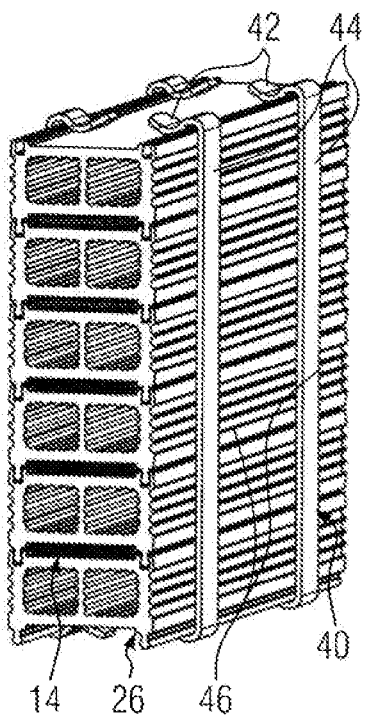 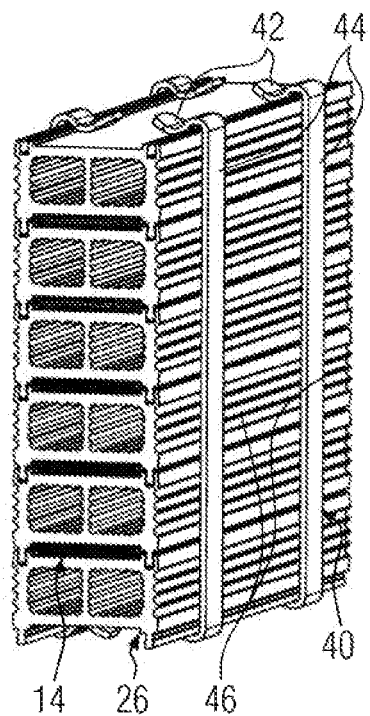
FIG. 5A  FIG. 5B  FIG. 5C
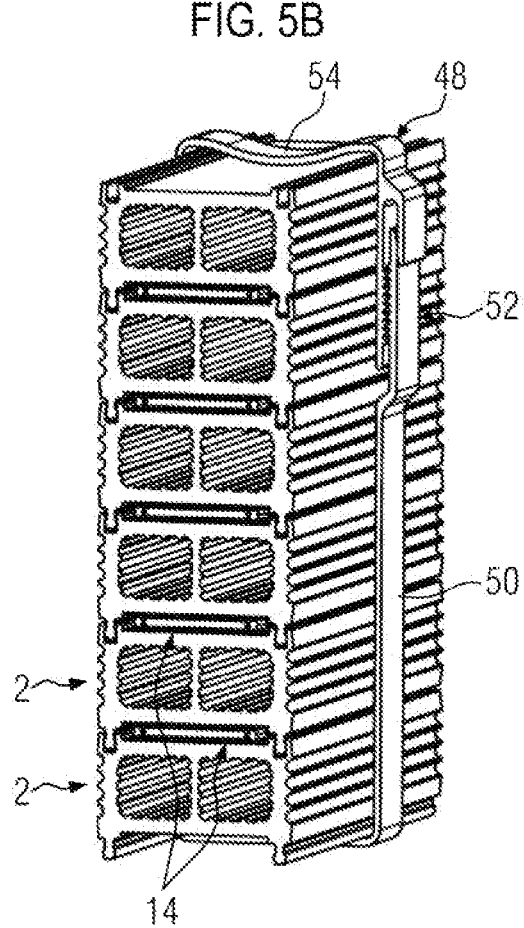
FIG. 5D

ELECTRIC HEATING DEVICE

BACKGROUND OF THE INVENTION

1. Field of the Invention

The present invention relates to an electric heating device with at least two hollow profile elements which are in general identically configured in cross-section and which in each case form in their interior at least one fluid channel for a fluid to be heated and, on the outside opposite the fluid channel, contact surfaces which are opposite one another and against which at least one PTC element abuts in a heat-conducting manner.

2. Background of the Invention

An electric heating device with at least two hollow profile elements and contact surfaces against which at least one PTC element abuts in a heat-conducting manner is known from EP 0 899 985 A1 of the applicant. In this prior art, the hollow profile elements each consist of extruded profiles which, for precise positioning relative to one another adjacent to the contact surfaces, form inclined surfaces by means of which the hollow profile elements are positioned in a plane parallel to the contact surface with the inclusion of the PTC element. Cohesion of a stack of several hollow profile elements is only achieved by means of spring clips which abut on opposite sides in the height direction of the stack and hold the individual elements of the stack against each other. The PTC elements and their associated electrode sheets should abut against each other under low pressure.

SUMMARY

The manufacture of the above-mentioned device is complex. The exact positioning and inclusion of the PTC heating elements between the individual hollow profile elements is dependent on the precise observance of tolerances.

Based on this, the underlying problem of the present invention is to provide an electric heating device which can be formed from a plurality of hollow profile elements, which, however, can also be handled more easily during manufacture without the need to observe tight tolerances.

In order to solve this problem, the present invention suggests an electric heating that has at least two hollow profile elements, which may be configured identically. These two hollow profile elements form at least one fluid channel for a fluid to be heated and, opposite the fluid channel, a heating chamber which is bounded by mutually opposite contact surfaces against which at least one PTC element abuts in a heat-conducting manner Complementary form-fit segments connect the hollow profile elements to one another.

The hollow profile elements can be formed by extruded profiles as in the prior art. Thus, the electric heating device can be manufactured in a scalable manner and with different heat output by appropriately cutting the hollow profile elements to length, either by adjusting the length of the hollow profile elements per se to the heat output and/or by adjusting the number of hollow profile elements used to manufacture the electric heating device. The hollow profile elements are, on the one hand, housings for accommodating the PTC element, but on the other hand, they also each form at least part of a fluid channel and thus the means for guiding the fluid to be heated.

The form-fit segments of adjacent hollow profile elements are complementary, by which it is to be understood that form-fit segments of adjacent hollow profile elements directly connect the two adjacent hollow profile elements to each other. The connection is such that the hollow profile elements can be handled as a unit. In particular, the form-fit segments also create a connection between the two hollow profile elements in a direction orthogonal to the contact surface. Thus, one of the hollow profile elements cannot be handled without the other of the hollow profile elements.

Complementary form-fit segments are created in particular by the form-fit segment of one hollow profile element forming a male contact element and the form-fit segment of the opposite hollow profile element forming a female contact element, which after joining achieve a connection of the two hollow profile elements. The form-fit segments may be configured as corresponding support segments.

In the connected state, the two hollow profile elements can enclose and seal a fluid channel between them. Alternatively, the two interconnected hollow profile elements form the heating chamber between them. Thus, the opposing contact surfaces are each formed by one of the hollow profile elements. Due to the complementary form-fit segments, such a PTC element can no longer be readily removed from the heating chamber formed between the opposing contact surfaces after the hollow profile elements have been connected. Rather, in this configuration of the electric heating device, the contact surfaces are each projected laterally by complementary form-fit segments, via which the two hollow profile elements are connected to one another.

The smallest configuration of the heating device according to the invention is typically achieved in that at least one PTC heating element is provided between two contact surfaces formed by a first hollow profile element and is applied against the contact surfaces in a heat-conducting manner. This hollow profile element also typically forms a fluid channel. The other fluid channel is formed on the opposite side between this one hollow profile element and a further hollow profile element, which is connected to the one hollow profile element via the form-fit segments.

In this case, the one hollow profile element can have form-fit segments on both opposite sides and thus be inserted into a stack of a plurality of identical hollow profile elements, in each of which the PTC element is provided inside a heating chamber formed via a single hollow profile element. One of the main walls of the hollow profile element, which extends parallel to the contact surface, may thereby be of convex shape, optionally also with an inwardly projecting contact surface. Between this contact surface and the outer edge, the hollow profile element may have a deformation area of reduced cross-section on which a deformation tool acts after the PTC element has been inserted into the heating chamber and before the other hollow profile element has been connected to the one hollow profile element.

In the fluid channel, ribs can be provided which protrude from the main wall and improve heat transfer to the medium to be heated and flowing in the fluid channel.

The form-fit segments may project laterally beyond the respective contact surfaces to the at least one PTC element. The PTC element is accordingly located in the extension direction of the hollow profile element between the two form-fit segments. Thus, the interconnected form-fit segments also achieve an outside enclosure of the PTC element and the strip conductors usually provided for this purpose, which are contacted with different polarity for energizing the PTC element and are usually provided plane-parallel to the contact surface. Between the contact surface and these strip conductors, further electrical insulation can be provided to prevent direct electrical contact between the strip conductors and the hollow profile elements, which are usually made of metal. However, the hollow profile elements can also be made of a ceramic. In this case, insulation can be dispensed with.

In terms of the material properties of the hollow profile elements, it is only important that they can be produced cost-effectively by extrusion or extrusion molding. For example, the hollow profile elements can be made of aluminum. The hollow profile elements can likewise be extruded as a green compact of a flowable compound containing a significant proportion of ceramic particles and then debinded and sintered.

According to a preferred further development of the present invention, the form-fit segments form a tongue and groove connection. The tongue may thereby be positively locked in the groove in the manner of a support element. For this purpose, the groove may have a head the width of which is greater than the mouth of the groove. Thus, the head of the tongue can be pressed into the groove with elastic expansion of the wall segments bounding the groove. The wall segments are slightly V-shaped, i.e. the distance between the opposing wall segments is closer together in the mouth opening area of the groove than in the area of the groove base. This configuration achieves a positive tongue and groove connection in which the tongue locks into the groove. The two hollow profile elements connected in this way can thus be handled as a unit. In addition, the connection allows a certain tolerance compensation. The PTC elements are ceramic components the thickness of which is not always identically configured. Thickness tolerances must be adjusted by changing the distance between the two hollow profile elements so that the PTC elements with their main side surface abut the opposite contact surfaces in a good heat-conducting manner By adapted selection of the depth of the groove, the tongue can migrate sufficiently within the groove and in a direction orthogonal to the contact surface without losing the positive connection. This configuration allows tracking of thickness tolerances of the PTC element.

Alternatively or additionally, the form-fit segment can comprise a saw-tooth profile that permits positive locking of the hollow profiles with different distances between the opposing contact surfaces. In this configuration, each tooth of the saw-tooth profile can engage over a detent surface of the complementary form-fit segment. Thus, the individual teeth of the saw-tooth profile offer the possibility of fixing the hollow profile elements to each other at varying distances between the opposing contact surfaces formed by the two hollow profile elements. This means that not only can the variation in the thickness of the individual PTC elements be compensated for. Rather, for basically any thickness within the expected thickness tolerance, a definition of the opposing hollow profile elements can be achieved due to the form-fit segments, in which the PTC element abuts against the opposing contact surfaces without considerable play, if necessary even under pretension, which favors a solid decoupling of the heat generated by the PTC element.

In order to simplify assembly, it is suggested according to a possible further development of the present invention that the form-fit segments be configured in such a way that the hollow profile elements are connected to one another in a movable and captive manner orthogonally to the contact surface. This further development is based on the consideration that after the form-fit segments have been connected, the two or more hollow profile elements are already joined as a stack to form a unit, however, this does not yet provide the best possible heat-conducting contacting of the PTC element at the associated contact surfaces. For this purpose, the stack of several hollow profile elements is usually encompassed by a clamping means by which the contact surfaces are applied against the associated PTC element without play, if necessary with pretension. This does not necessarily mean that the contact surfaces are in direct contact with the PTC element.

The tensioning means can be a metal strip surrounding the stack and abutting the respective outer hollow profile elements of the stack under a certain elastic pretension. Thereby, the tensioning can be effected by deforming the metal strip. Alternatively, bands of a metal band completely or partially encompassing the stack can also be connected to each other in the manner of a ratchet so that the desired effective length of the metal band and thus the pretension of the stack can be achieved via the form-fit segments interacting with each other.

The hollow profile elements of the electric heating device according to the invention serve in particular to transfer the heat generated by the PTC element or PTC elements to the fluid to be heated. It is understood that the hollow profile elements produced by extrusion are connected to components for guiding the fluid in a sealed manner on the end faces. The fluid can pass through the stack of hollow profile elements in a parallel circuit and/or a series circuit. In a series connection, each hollow profile element may have at least two heating channels separated by a partition wall. The fluid to be heated can be connected in series through these different heating channels. Thus, according to this further development, the hollow profile elements are provided with a cover on one end face, through which the flow is diverted from one fluid channel of the hollow profile element into the other fluid channel of the hollow profile element. A connection housing is provided on the opposite end face, which connects one of the fluid channels to an inlet opening for the fluid to be heated and the other of the fluid channels to an outlet opening for the fluid to be heated.

The hollow profile elements used in a stack allow several such series-connected fluid flows to be additionally connected in parallel, thus making it relatively easy to adapt the heating power of the electric heating device.

According to a possible further development, the connection housing has electrical conduction paths, usually strip conductors made of sheet metal strips, with which the at least one PTC element is electrically conductively connected to its opposite sides and which are connected to an interface for the power current. The connection housing is thus implemented not only for guiding the fluid, but also for the electrical connection of the power current for energizing the PTC element. The connection housing can also accommodate a control device for controlling the power current, which is connected to the electrical conduction paths of the strip conductors. With regard to a compact configuration, this control housing may be located on an outer surface of at least one of the hollow profile elements. The control housing may but this outer surface, which extends at right angles to the contact surface. In other words, the corresponding outer surface of the hollow profile element extends approximately parallel to the extension direction of the complementary form-fit segments.

According to a possible further development of the present invention, the electric heating device has a function module that is connected to a hollow profile element via at least one form-fit segment. When a plurality of hollow profile elements are stacked, the functional module is located on the outside and thus at the top or bottom in the height direction of the stacked hollow profile elements. According to this further development, the suitability of the form-fit segments for producing a positive connection is then used to connect a functional module to the stack of hollow profile elements. For example, a retaining device for connecting the electric heating device to a chassis of a vehicle or the like is used as a functional module. A functional module may also be a pump for delivering the fluid to be heated or a control device for controlling the power flow. The functional module may at least partially form the fluid channel or heating chamber and may be an extruded profile or may comprise such a profile.

The functional module may comprise an extruded profile which has complementary form-fit segments and is connected via these to the hollow profile elements and has mechanical interfaces in the form of slots or holes in which attachment elements such as screws or threaded rods or other form-fit segments can engage. The housing of a pump or a control system can be connected to such function modules. A separate attachment element for mounting the electric heating device on the chassis of a vehicle may just as well be connected to the functional module.

Accordingly, the electric heating device according to the invention offers the possibility of configuring a smallest unit consisting of two hollow profile elements and a PTC element provided therebetween as a fully functional heating section of an electric heating device, wherein components for guiding the fluid into and out of the hollow profile elements are provided on the end faces of the hollow profile elements cut to length. The fluid flows in the various hollow profile elements are typically bundled. The advantage of connecting the respective hollow profile elements of a stack to one another via the form-fit segments to form a unit and accordingly to handle them jointly is realized in particular in the case of a plurality of hollow profile elements forming the stack, by means of which an electric heating device with a substantially higher heating power can be provided. The hollow profile elements are both part of the housing, which carries the fluid, and a receptacle for other functional elements of the electric heating device, such as the PTC element. The stack of several hollow profile elements is usually joined by a plug-in connection. The pressing of the PTC heating assembly within the heating chamber between the opposing hollow profile elements is usually performed by a separate element in the form of a clamp. Thereby, the form-fit segments do not impede the relative movement between the individual hollow profile elements connected to form a stack, which is necessary for this purpose. The hollow profile elements usually have an essentially rectangular basic shape and are only projected by the form-fit segments, which in this respect also provide EMC protection and accommodate the components carrying the power current between them. Due to the rectangular basic shape, hollow profile elements can be arranged not only one above the other but also directly next to each other to save space. Such a heating cell of an electric heating device can be connected to various additional components such as a support for mounting, pumps or a control device via the form-fit segments.

BRIEF DESCRIPTION OF THE DRAWINGS

Further advantages and details of the present invention will be apparent from the following description of an embodiment in conjunction with the drawing. Therein:

FIGS. 5A-5D show perspective views of the end faces of a stack with different variants of clamps for bracing the stack;

DETAILED DESCRIPTION

Figure 1:
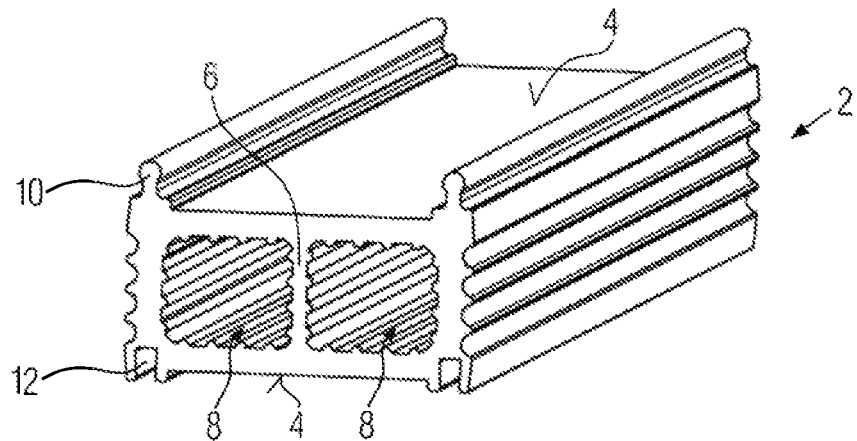
FIG. 1 shows a perspective front view of an embodiment of a hollow profile element.

FIG. 1 shows a perspective front view of a hollow profile element 2 in the form of an extruded profile with a substantially rectangular base area. A partition wall 6 protrudes from opposite contact surfaces 4, dividing a central cavity of the hollow profile element 2 into two fluid channels 8. The contact surfaces 4 are projected at the edges by tongues 10 at the top and by grooves 12 at the bottom, which form form-fit segments in the sense of the present invention. These form-fit segments 10, 12 extend the hollow profile element 2 in the height direction.

Figure 2:
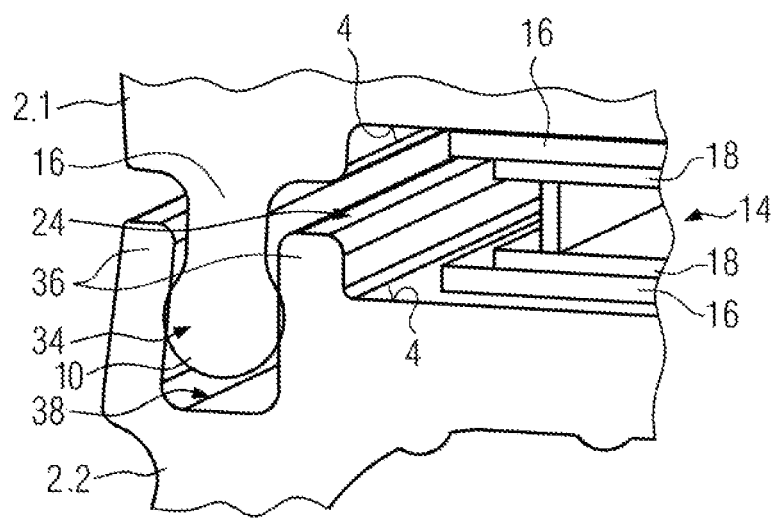
FIG. 2 shows a perspective front view of joined form-fit segments of two interconnected hollow profile elements.

FIG. 2 illustrates the joining of two adjacent hollow profile elements 2.1 and 2.2. A PTC heating assembly 14 with two insulating layers 16 in the form of separate ceramic plates applied against the main side surface 4 is located between opposing contact surfaces 4 of the respective hollow profile elements 2.1, 2.2. These insulating layers are provided between the contact surfaces 4 and the strip conductors 18 and support the same in an electrically insulating manner with respect to the contact surface 4. The strip conductors 18 accommodate between them a PTC element 20 and a position frame 22 which spaces apart a plurality of PTC elements 20 one behind the other in a plane in the longitudinal direction L of the hollow profile element.

As FIG. 2 illustrates, the joined form-fit segments 10, 12 project vertically beyond a heating chamber 24 formed between the main side surfaces 4. In this way, the heating chamber 24 is electromagnetically shielded from the outside. In this context, it is irrelevant whether the groove 12 and the tongue 10 each project beyond the contact surface 4 associated therewith. It is only important that the heating chamber 24 is also laterally enclosed by the metallic material of the hollow profile elements 2.1, 2.2. The hollow profile elements 2 are made of aluminum.

Figure 3:
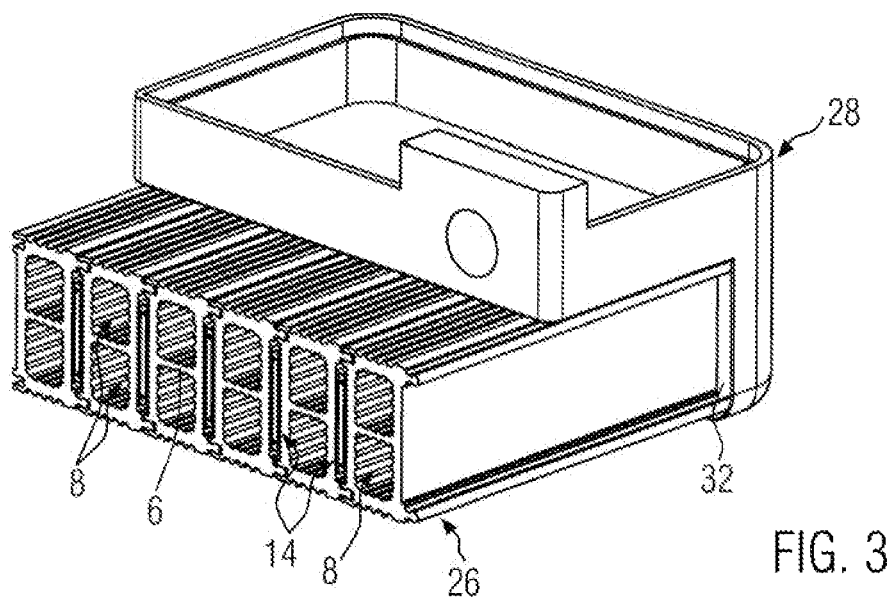
FIG. 3 shows a perspective side view of an embodiment of an electric heating device.

FIG. 3 shows a stack, characterized by reference sign 26, of several hollow profile elements 2 connected to each other via the form-fit segments 10, 12, each of which accommodates a PTC heating assembly 14 between them. At an end face of the stack 26, a connection housing 28 is shown, which is applied sealingly against the respective fluid channels 8 and forms inlet and outlet openings, not shown, for the introduction and discharge of a fluid to be heated from the electric heating device. This connection housing 28 is sealed from the stack 26 via a molded seal. The seal also covers the respective heating chambers 24 so that the PTC heating assemblies 14 are separated from the fluid to be conducted.

FIG. 3 schematically shows a control housing segment 30 of the connection housing 28 for accommodating a control device, not shown, for controlling the power current. This is electrically connected to the strip conductors 18 of the respective PTC heating assemblies 14. For this purpose, the strip conductors 18 formed from sheet metal strips are extended over the stack 26. The connection housing 28 can form plug-in element receptacles which are plugged into the terminal lugs of the strip conductors 18 when the connection housing 28 is slid open.

The connection housing 28 has flange surfaces 32 laterally enclosing the stack 26, which brace the stacking 26 so that the respective PTC heating assemblies 14 rest with a certain pretension against the associated contact surfaces 4. In any case, the flange surfaces 32 are designed to interact with the contour of the tongue 10 and groove 12 in such a way that the connection housing 28 is positively fixed relative to the stack 26.

The fixing of the hollow profile elements 2 against each other via the respective form-fit segments 10, 12 can be taken from FIG. 2. Therein, reference sign 34 illustrates a widened head as part of the tongue 10 which is engaged in the groove 12. Opposite wall segments 36, which laterally delimit the groove 12, are inclined towards each other. Thus, the mouth of the groove 12 is narrower than an area of the groove 12 near its groove bottom 38. As a result, the adjacent hollow profile elements 2 are locked and captive to each other after the tongue 10 is inserted into the groove 12.

In FIG. 2, there is still sufficient distance between the head 34 and said groove bottom 38. In this context, the PTC heating assembly 14 is already abutting against the opposing contact surfaces 4. The corresponding free space between the head 34 and the groove bottom 38 can accommodate a further relative movement of the hollow profile elements 2 when these are braced against each other in order to apply the layers of the PTC heating assembly 14 against each other under pretension.

Figure 4:
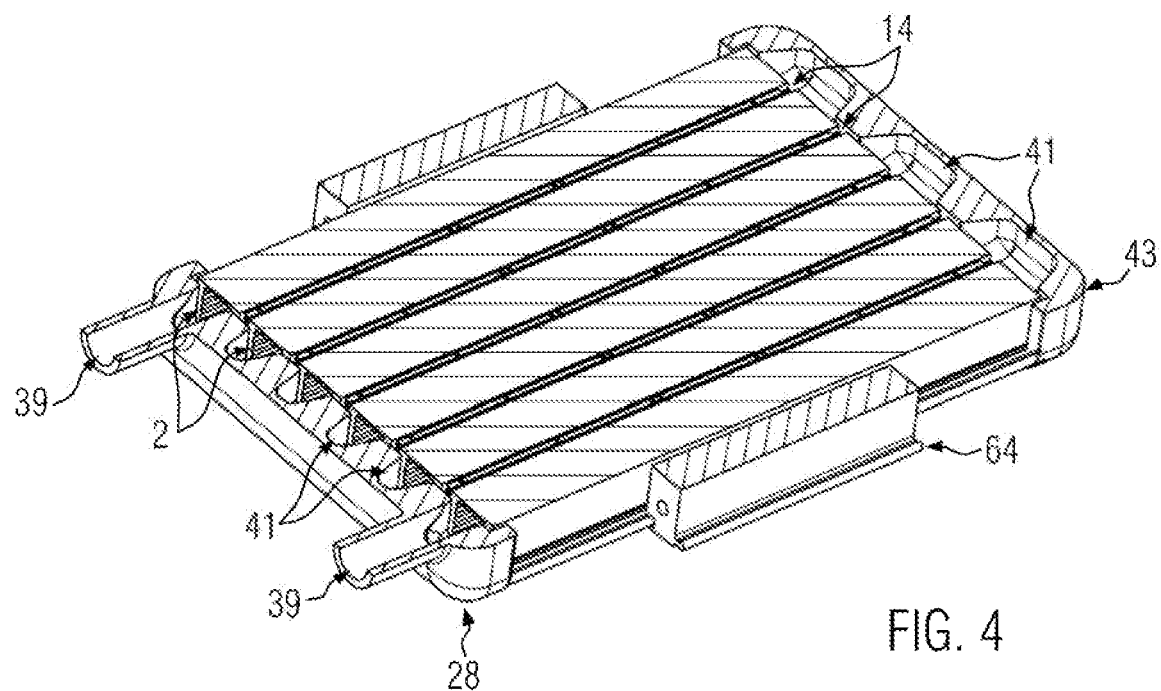
FIG. 4 shows a perspective sectional view of an embodiment different from that shown in FIG. 3.

FIG. 4 illustrates a cross-sectioned embodiment with several hollow profile elements 2, each of which accommodates PTC heating assemblies 14 between them, as described with reference to the preceding Figures. On the left side in FIG. 4, a connection housing 28 is provided with inlet and outlet openings 39, which are formed by nozzles projecting beyond the actual connection housing 28. Internally, this connection housing 28 forms deflection chambers 41 which communicate with adjacent fluid channels 8 to transfer the flowing medium from one fluid channel 8 to the adjacent fluid channel 8. Similarly, a cover characterized by reference sign 43 is configured to form deflection chambers 41 for the flowing fluid on the side opposite the connection housing 28.

Various possibilities for bracing the hollow profile elements 2 are shown in FIGS. 5A-D.

According to the variant according to FIG. 5A, L-shaped bent-over clamps 40 are pushed over the stack 26. The ends of the clamps, which are characterized by reference sign 42, are bent at right angles to a web 44 of the clamp 40 and curved convexly in the direction of the stack 26. Thus, the raised form-fit segments 10, 12 are positively encompassed by the clamp 40. The clamp 40 is dimensioned such that a pretensioning force is effected in this case, which is guided in each case over the contact surfaces 4 and through the PTC heating assemblies 14. The form-fit segments 10, 12 do not transmit the contact pressure force. These form-fit segments 10, 12 merely serve to fix the hollow profile elements 2 in a direction opposite to the pretensioning force.

In the variant shown in FIG. 5B, the webs 44 are bent over in a W-shape in their center, thereby forming a spring segment 46 through which the clamp 40 is able to store an elastic pretensioning force in an improved manner.

According to the variant shown in FIG. 5C, the spring segments 46 are formed in a trapezoidal shape. The spring segment 46 can be formed after the clamps 40 have been placed around the stack 26 by a forming tool forming the spring segments 46 by cold forming and thereby setting the desired clamping force in the clamp 40. In this way, during the manufacture of the heating device, adding tolerances due to different thicknesses of the individual PTC elements can be compensated.

This effect is also shown in the variant according to FIG. 5D. This shows a clamp 40 circumferentially surrounding the stack 26, consisting of a first clamp component 48 and a second clamp component 50, each of which is bent around in a U-shape. The clamp components 48, 50 are connected to each other by a positive connection 52 comprising a plurality of cooperating teeth so that the two clamp components 48, 50 can be pushed together to the extent desired to brace the stack 26 and secured against each other. On the outer exposed contact surfaces 4, a head portion 54 of the respective clamp components 48, 50, which is convexly curved in the direction of the stack 26, abuts under elastic pretension.

Figure 6:
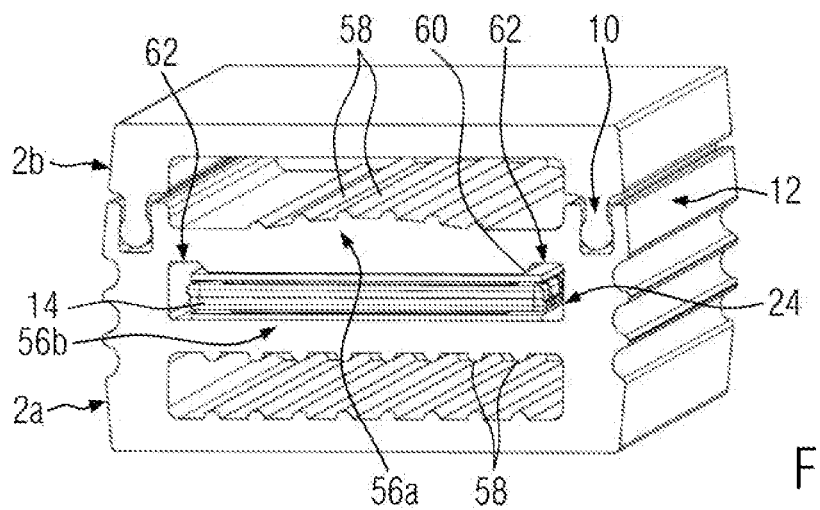
FIG. 6 shows a perspective front view of another embodiment of an electric heating device according to the present invention.

In the embodiment shown in FIG. 6, the electric heating device has a first hollow profile element 2a and a second hollow profile element 2b, which are connected to each other by a tongue 10 and a groove correspondingly provided thereto, with the PTC heating assembly 14 being provided in the heating chamber 24. Ribs 58 project from main walls 56a, b, which enclose the fluid channel 8 between them, are integrally formed on the hollow profile elements 2 and are intended to improve heat transfer between the PTC heating assembly 12 and the fluid in the fluid channels 8.

In the embodiment according to FIGS. 6 to 9, the PTC heating assembly 14 is held in the respective hollow profile element 2a by clamping between the main side walls 56a, b with good thermal conductivity. The main wall characterized by reference sign 56a has a crowned shape and is correspondingly stiffened at the center. The contact surface 4 is formed with a step 60 projecting in the direction of the PTC heating assembly 14. Between this step 60 and a side edge of the hollow section, edge-side deformation areas 62 of reduced cross-section are formed. A deformation tool can act there. The deformation force applied in this process acts outside the contact surface of the hollow profile element 2a to the PTC heating assembly 14. During this deformation, the hollow profile element 2a can be enclosed at the edge so that the deformation tool only acts locally on the deformation area 62, but the basic shape of the hollow profile element 2a otherwise remains unchanged. Impeding the compensating movement of the hollow profile element 2a improves the abutment of the PTC heating assembly 14 under pretension against the contact surfaces 4.

Figure 7:
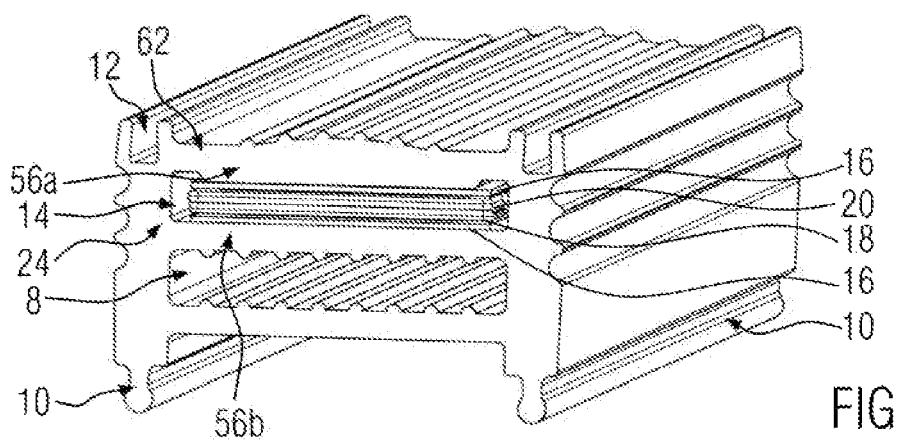
FIG. 7 shows a variation on the embodiment shown in FIG. 6.

FIG. 7 shows a hollow profile element 2 that can be integrated into a stack of multiple hollow profile elements. This embodiment has a heating chamber 24 as described above, in which the PTC heating assembly 14 is accommodated in the manner described above. This hollow profile element 2 has form-fit segments on opposite sides in the form of a groove 12 (top) and in the form of a tongue 10 (bottom), respectively.

Figure 9:
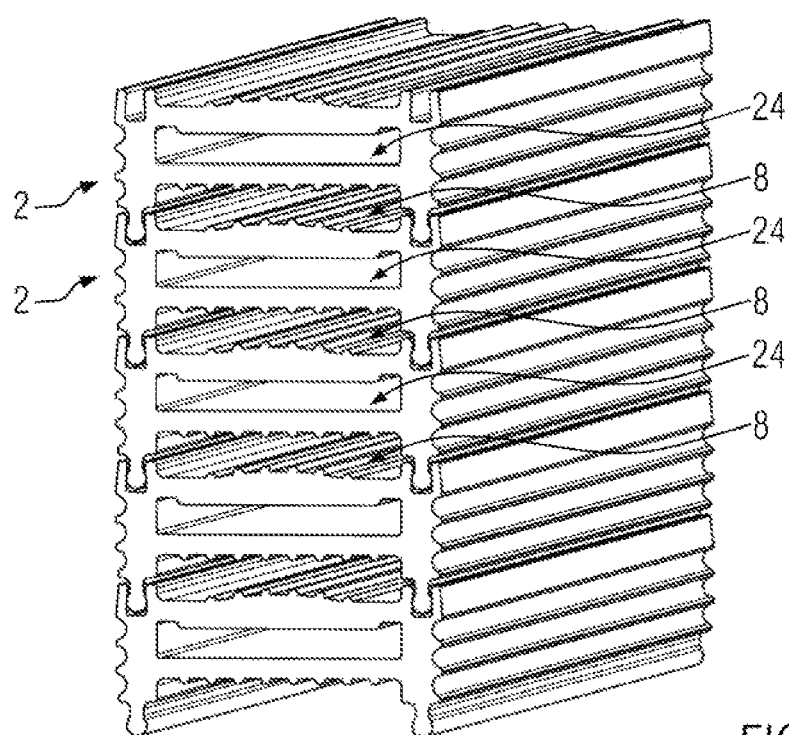
FIG. 9 shows a stack of hollow profile elements approximately as shown in FIG. 7.

FIG. 9 illustrates a stack 26 consisting of such hollow profile elements 2. This stack 26 can be surrounded by at least one clamp segment as previously described with reference to FIGS. 5A-D. For sealing the individual fluid channels 8, which are each bounded by two hollow profile elements 2, a permanently elastic sealant or a setting adhesive can be filled into the groove 12. Additionally or alternatively, such a sealant can also be applied against the wall segments at the ends.

Figure 8:
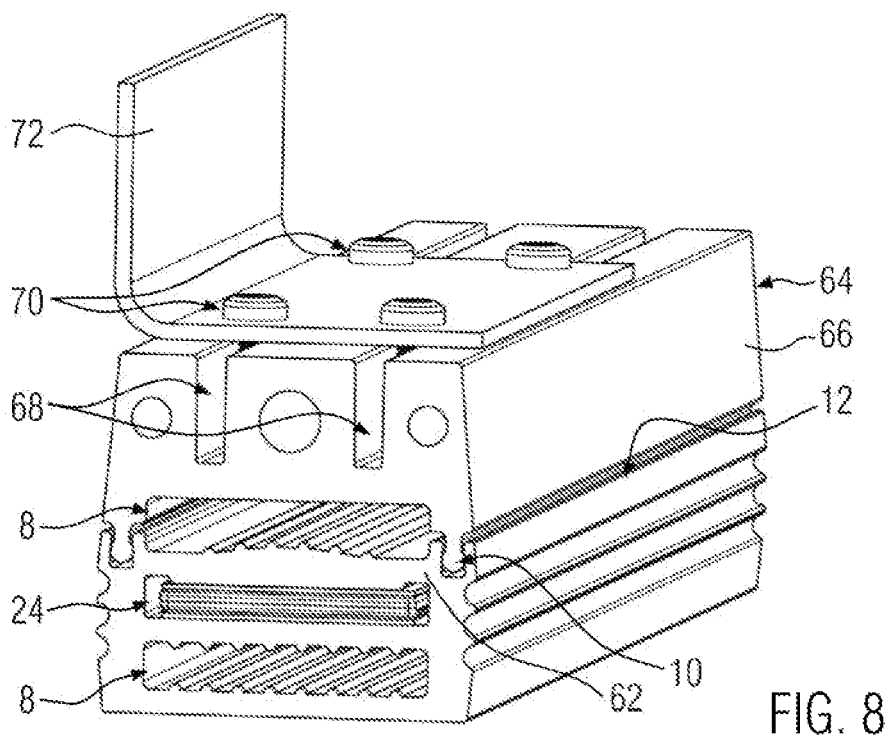
FIG. 8 shows the embodiment according to FIG. 6 with an embodiment of a function module.

FIG. 8 shows a variant of the embodiment according to FIG. 6. Reference sign 64 characterizes a functional module comprising an extruded profile 66. This extruded profile has form-fit segments in the form of tongues 10 provided at the edges, which engage in the grooves 12 of the hollow profile element 2a and thereby seal off one of the fluid channels 8. The extruded profile 66 has two fastening grooves 68 open towards the main side, into which self-tapping screws 70 are screwed, which penetrate an angle plate 72, via which the electric heating device can be mounted, for example, on the chassis of a vehicle.

Figure 10:
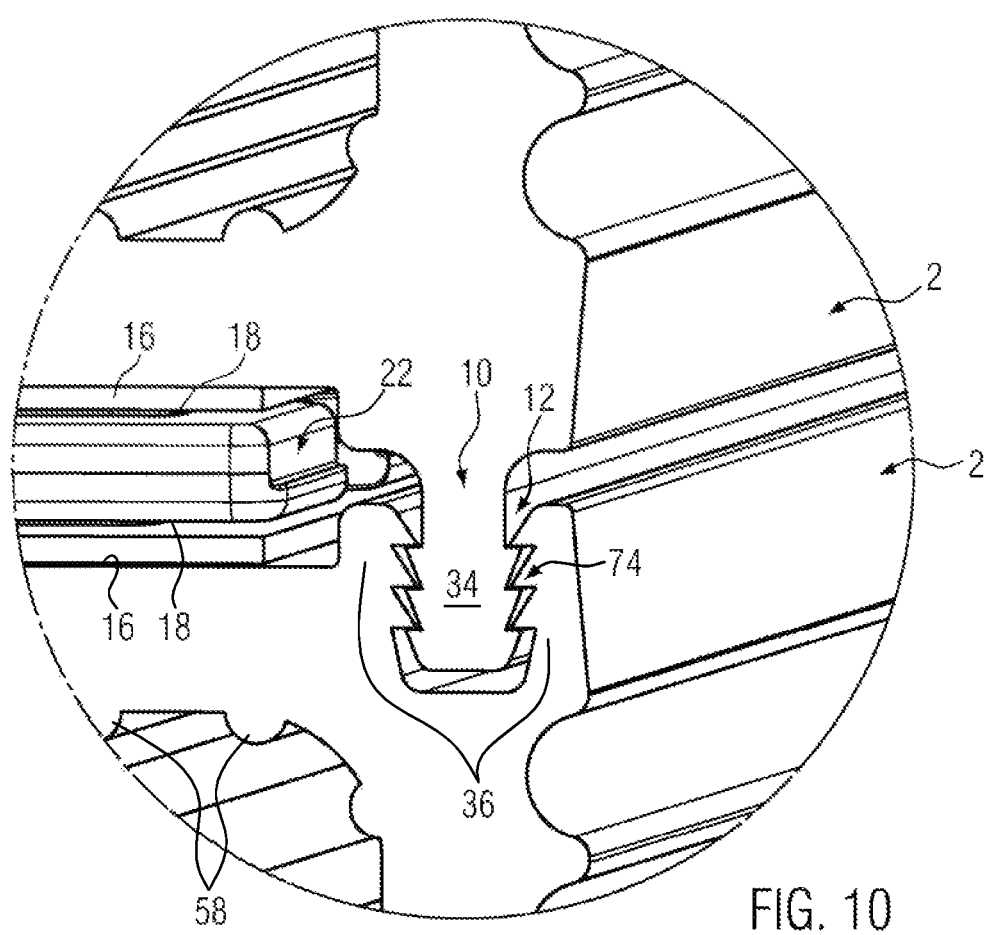
FIG. 10 shows a perspective front view of joined form-fit segments of two hollow profile elements connected by a saw tooth profile.

FIG. 10 illustrates form-fit segments with a corresponding saw tooth profile 74. In this context, saw teeth are provided on both sides of the head 34 and the inner surfaces of the wall segments 36. This saw tooth profile acts like a ratchet. The hollow profile elements 2 can be positively fixed at different distances relative to each other. Tolerance compensation is also provided by insulating layers 16 with compressible properties, the thickness of which can be varied while storing elastic pretension. The insulating layers 16 are provided at a distance from the lateral boundary of the heating chamber 24. The insulating layers 16 are accordingly less wide than the heating chamber 24. The insulating layers 16 can accordingly be stretched in the width direction.

What is claimed is:

1. An electric heating device, comprising:
    at least two hollow profile elements which form a fluid channel for a fluid to be heated and which form a heating chamber which is bounded by opposite contact surfaces;
    at least one PTC element which abuts against at least one of the contact surfaces in a heat-conducting manner; and
    complementary form-fit segments which connect the hollow profile elements to one another such that the form-fit segments also provide a connection of the hollow profile elements in a first direction orthogonal to the contact surfaces.

2. The electric heating device according to claim 1, wherein the fluid channel or the heating chamber is laterally delimited by the form-fit segments.

3. The electric heating device according to claim 1, wherein the form-fit segments form a tongue and groove connection, and wherein the tongue is positively locked in the groove.

4. The electric heating device according to claim 3, wherein the form-fit segments comprise a saw tooth profile which allows a positive locking of the hollow profile elements with different distance of the opposing contact surfaces.

5. The electric heating device according to claim 3, wherein the form-fit segments are configured such that the hollow profile elements are movably and captively connected to each other in a second direction orthogonal to the contact surfaces.

6. The electric heating device according to claim 1, wherein
    each hollow profile element forms at least two fluid channels separated by a partition wall, and wherein each of the hollow profile elements is provided on an end face thereof with a cover through which fluid flow from one fluid channel of the hollow profile element is deflected into the other fluid channel of the hollow profile element, and wherein
    at least one of the hollow profile elements is provided with a connection housing which connects one of the fluid channels to an inlet opening for the fluid to be heated and the other of the fluid channels to an outlet opening for the fluid to be heated.

7. The electric heating device according to claim 6, wherein the connection housing comprises electrical conduction paths connecting strip conductors, which are electrically conductively connected to the PTC element, to an interface for power current.

8. The electric heating device according to claim 7, wherein the electrical conduction paths connect the strip conductors to a control housing which accommodates therein a control unit for controlling the power current and which abuts an outer surface of at least one of the hollow profile elements that extends perpendicularly to the contact surface.

9. The electric heating device according to claim 7, wherein the connection housing and the control housing are formed in a common component which is connected in a fluid-tight manner at an end face to the hollow profile elements.

10. The electric heating device according to claim 1, wherein the hollow profile elements of the electric heating device are encompassed by a clamp.

11. The electric heating device according to claim 1, wherein the hollow profile elements are arranged in a stack, and wherein a functional module is connected to an outside surface of the stack of hollow profile elements via at least one of the form-fit segments that is exposed on the outside surface of the stack.

* * * * *